(No Model.)
J. F. STRANGE.
BIT.
No. 362,044. Patented Apr. 26, 1887.
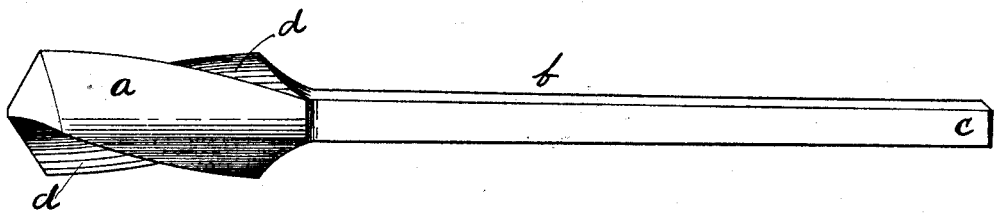

UNITED STATES PATENT OFFICE.

JOHN F. STRANGE, OF NEW BEDFORD, MASSACHUSETTS.

BIT.

SPECIFICATION forming part of Letters Patent No. 362,044, dated April 26, 1887.

Application filed January 22, 1887. Serial No. 225,058. (No model.)

*To all whom it may concern:*

Be it known that I, JOHN F. STRANGE, a citizen of the United States, residing at New Bedford, in the county of Bristol and State of Massachusetts, have invented a new and useful Improvement in Chucking-Drills, of which the following is a specification.

My invention relates to that class of drills used in a lathe where the drill remains stationary and the work revolves, the butt-end of the drill resting against the center in the tail-stock and the drill supported near its point in a device held in the tool-rest.

Heretofore flat drills only have been used as chucking-drills, (or "chuck-drills," as they are sometimes called,) and in their use there have been great disadvantages on account of their slow-cutting qualities, and the necessity of frequent dressing, in order that the work be properly and accurately performed, and the expense of making and keeping them in order.

The object of my invention is to avoid these objections; and to this end my invention consists in a chucking-drill having its point or cutting end composed of a short rounded portion of suitable size, with spiral or straight grooves formed in opposite sides thereof, and its shank flattened, so as to adapt it to move freely through the holding device in the tool-rest.

The accompanying drawing illustrates my invention.

$a$ is the short rounded portion having grooves $d$; and $b$ is the flat shank adapted to be held in the device in the tool-rest. The shank $b$ is provided with a female center, $c$, to engage with the center in the tail-stock of the lathe. As above stated, the grooves $d$ in the cutting end of the drill, may be straight, instead of spiral, as shown, without departing from my invention.

A chucking-drill constructed in the manner described will cut more freely and rapidly and bore a more accurate hole than an ordinary flat drill, and can more easily be kept in order.

Having thus described my invention, what I claim, and desire to secure by Letters Patent, is—

A chucking-drill consisting of a short rounded portion provided with grooves at its cutting end and a flat shank, substantially as shown and described.

JOHN F. STRANGE.

Witnesses:
HENRY W. MASON,
JOS. C. KNOWLES.